US009674360B2

(12) United States Patent
Hartman et al.

(10) Patent No.: US 9,674,360 B2
(45) Date of Patent: Jun. 6, 2017

(54) MANAGEMENT OF CONTACTS AT CONTACT CENTERS (75) Inventors: Michael Hartman, Galway (IE); Neil O'Connor, Galway (IE); Tony McCormack, Galway (IE); Thomas Howley, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 466 days.

(21) Appl. No.: 13/450,820

(22) Filed: Apr. 19, 2012

(65) Prior Publication Data

US 2013/0282744 A1    Oct. 24, 2013

(51) Int. Cl.
*G06F 17/30* (2006.01)
*H04M 3/51* (2006.01)
*G06Q 30/02* (2012.01)

(52) U.S. Cl.
CPC ..... *H04M 3/5183* (2013.01); *G06F 17/30864* (2013.01); *G06Q 30/02* (2013.01)

(58) Field of Classification Search
None
See application file for complete search history.

(56) References Cited

U.S. PATENT DOCUMENTS

| 7,054,434 | B2 * | 5/2006 | Rodenbusch et al. ... 379/265.02 |
| 7,254,641 | B2 * | 8/2007 | Broughton et al. .......... 709/240 |
| 7,804,953 | B1 * | 9/2010 | Antonios ................ H04M 3/42 370/218 |
| 2003/0174830 | A1 * | 9/2003 | Boyer ..................... H04M 3/51 379/265.02 |
| 2005/0044129 | A1 * | 2/2005 | McCormack et al. ........ 709/200 |
| 2005/0177380 | A1 * | 8/2005 | Pritchard ....... G06Q 10/063118 705/7.17 |
| 2006/0041444 | A1 * | 2/2006 | Flores .................... G06Q 10/06 379/265.05 |
| 2009/0285385 | A1 * | 11/2009 | Dunbar ................. H04M 3/523 379/266.01 |
| 2010/0077082 | A1 * | 3/2010 | Hession .............. G06Q 30/016 709/227 |
| 2012/0281825 | A1 * | 11/2012 | Segall et al. ............... 379/265.1 |

* cited by examiner

*Primary Examiner* — Mark E Hershley
*Assistant Examiner* — Raheem Hoffler (57) ABSTRACT In a contact center, a new contact is compared with other contacts which are currently active at the contact center to identify a matching contact having a common source with the new contact, following which at least one of the new and matching contacts is terminated or provided with increased resources or higher priority according to contact center rules.

20 Claims, 7 Drawing Sheets

MANAGEMENT OF CONTACTS AT CONTACT CENTERS

BACKGROUND

Field of the Invention

This invention relates to the management of contacts at a contact center.

Description of Related Art

Contact center operators and administrators are continually trying to optimize the contact center experience for users (also referred to herein as customers or contacts). A perpetual problem is that of load balancing, i.e. ensuring that the resources of the contact center at any given time are optimized for the number of users connected to or trying to connect to the contact center. A balance has to be struck between the cost of supplying sufficient resources (agents, supervisors, servers, applications, available connection ports, etc.) and the acceptable wait times for users of the contact center.

In many scenarios, the load is not constant and fluctuates significantly between quiet times and busy times. At busy times the users are likely to experience longer queue times and this may lead to users disconnecting due to excessive wait times.

The problem is exacerbated when users have multiple routes to access the contact center. It is common for users to attempt to generate several simultaneous contacts, e.g. by calling simultaneously from a landline, a mobile phone and a computer (using voice over IP (VoIP) applications) and to also connect to the contact center using instant messaging or web-based chat portals to the contact center. Users do this in the hopes of maximizing their chances for an early connection to an agent, e.g. by attempting to be placed multiple times in a queue for a scarce resource, such as a ticket agent, or by attempting to be placed in different queues each leading to an agent.

Such multiple connection attempts consume scarce resources of the contact center, as well as disadvantaging those other users who have made a single connection attempt. Such multiple connections also distort the activity levels of the contact center making it more difficult to gain an accurate picture of actual activity levels and requirements for servicing the contact center effectively.

Another important consideration for contact center operators and designers is to make the best possible use of resources such as human agents. This does not simply mean answering all calls as quickly as possible. There are inevitable trade-offs where any decision to devote additional attention to one contact is at the expense of other contacts, and thus it is desirable that such trade-offs are made with the best business interests of the contact center operator in mind. To this end, it would be advantageous to provide an improved way of deciding where to devote resources.

A further area of concern for contact center operators is to improve the experience of contacts who are unsuccessful in speaking to an agent and who abandon their attempts to do so before having been serviced. The abandonment of a call (or other contact attempt) is usually an indication of an unsatisfied customer, most frequently one who has been unable to reach an agent in an acceptable time and who has therefore not been satisfied at the time when the contact attempt is abandoned. It is of concern to businesses to leave such customers unsatisfied and it would be advantageous to improve the experience of such customers.

SUMMARY

There is provided a method of managing a contact at a contact center, comprising the steps of:

(a) receiving a new contact;
(b) determining an identifier which is indicative of the source of the new contact;
(c) performing a comparison between said identifier and a stored record of other identifiers associated with other contacts which are currently active at the contact center;
(d) identifying from said comparison another identifier indicative of a matching contact having a common source with the new contact; and
(e) terminating at least one contact selected from said new contact and said matching contact.

The method may be used to overcome the problem of multiple connection attempts by monitoring for and detecting multiple contacts from the same source. The match detection can be performed at the stage when the new contact initially arrives at the contact center and/or later in the interaction, perhaps for example when more information is gleaned to assist in such detection. The method then allows one or more of the contacts which appear to derive from a common source to be terminated.

Such termination can be carried out according to predefined rules, and thus the disconnection can happen immediately, or only if certain conditions are met (e.g. only when one contact connects to an agent, or only if two contacts are queuing for the same resource). Termination may also be subject to an interactive detection process, such as by requesting some unique and verifiable information from each source and checking for matches, or by causing the user to interact in some other way which provides additional information (e.g. comparing voice print characteristics in two or more interactive voice response sessions).

By detecting and terminating such multiple connection attempts, the method can also overcome a common issue where one connection attempt is connected to a scarce resource such as an agent, but the user does not remember to disconnect the other (slower, less successful) attempts until after the successful contact has terminated, if at all. Automatic disconnection of the other sessions enables queues to move more quickly and avoids human agents having to establish that a session is unresponsive.

Preferably, the method comprises the further step, carried out between the identifying step (d) and the terminating step (e), of detecting an additional condition which must be met before said terminating step (e) occurs.

For example, where contacts are assigned to queues for contact center resources, said additional condition may be the requirement that said new contact and said matching contact are queued in associated queues according to a predetermined association between queues.

Alternatively or additionally, said additional condition may be the requirement that one of the new contact and the matching contact is allocated a predetermined resource of the contact center.

Preferably, in this case, the predetermined resource is a connection to a human agent of the contact center.

Thus, the rules may be flexible to allow suspected multiple contacts from the same source to remain live until they are placed in the same queue, or until they are placed in associated queues, or until one or other contact is placed into communication with a live agent or some other scarce resource. Of course the termination may also be automatic and immediate.

The identifying step (d) may employ any suitable matching criterion, including calculating a match probability or threshold. Optionally, the additional condition may be tailored to the degree of confidence in the identified match.

The step of identifying another identifier indicative of a matching contact may comprise identifying an identical identifier. Preferably, however, the identifying step comprises a cross-reference to a further source, which includes additional information relating to said contacts.

For example, the further source may be a customer database, which includes multiple known identifiers for known customers. In this way, an IM username may be used as an identifier for an existing contact, and a telephone number may be used as an identifier for said new contact, and where a customer database records the same IM username and telephone number for the same customer, a match may be determined.

Some identifiers are generally unique to an individual (such as an email address, a credit card number, an IM username, a social security number, a username/password combination, a name and address combination, etc.), while other identifiers can be more ambiguous (such as a telephone number which is sometimes individual as in the case of a cellphone, and sometimes shared as in the case of a house or office landline; or an IP address which may be unique or may be shared and which maybe statically or dynamically assigned; or a computer's MAC address which is unique to a machine which may itself be shared). For these reasons, it is at the choice of the system designer or operator as to how much confidence is placed in any given match between identifiers and the action to be taken on detecting such a match. For the more ambiguous identifiers, a combination of pieces of matching information may be required in order to confirm that the sources of two communication sessions (contacts) are the same. The readiness with which an organization may be prepared to terminate a user's contact may also be influenced by the importance of the customer (priority level) or the nature of the transaction or information sought, and so again, the system designer or operator has freedom to tailor the rules to the needs of the organization operating or paying for the contact center.

In similar manner, it is at the choice of the system designer to decide which contact(s) should be terminated, i.e. the older or newer contact, or both.

The method is preferably embodied in one or more computer programs in the form of instructions carried on a non transitory computer-readable medium. Such media are of course well known and include magnetic and optical storage media such as hard disks, optical disks, flash drives, computer RAM, and distributed storage systems.

The invention has particular application in detecting multiple telephony sessions directed from a single user to a contact center. An example of this is where the contact center is a ticket sales center and the user tries to gain an unfair advantage by making multiple calls.

As used herein the term "contact center" is intended to cover networks of contact centers which act in co-operation with one another and the invention can be used to detect users connecting in multiple sessions to different contact centers in the same such network.

The following indicators, among others, may be indicative of the same originator of multiple contacts.

From the database of originators, for each contact they originated, determine the list of other originators that made contact within a small time frame (say, plus or minus 5 minutes). If a certain other originator appears frequently in the resulting lists, then it should be assumed to be related to the first originator.

For incoming contacts from known IP address, assume that other identities recorded against this IP address may be related to the one used in this contact.

A contact center can provide a user registration web page where users can input multiple IDs for themselves: phone number, email address etc. Contacts arriving with any of these IDs can be matched to previous contact history using the registration (association) database.

Agents can ask originators to provide alternate ID details and record this in the association database.

For contacts arriving via a web page/browser session, extract third party tracking cookie and use this to retrieve alternate identities for this originator from third-party web analytics or tracking services; mark these alternate identities as associated with the originator in the database, and vice-versa Information about the frequency of use of each identity/persona for an individual originator can be stored, and this can be used to provide a weighted profile of the originator's personas (e.g. this originator has used 2 identities in the past while contacting us, with a frequency of 70% for persona 1 and 30% for persona 2).

There is also provided a computer system for managing contacts at a contact center comprising:

(a) an interface to a communications system which receives a new contact;

(b) a memory storing identifiers of contacts which are active at the contact center;

(c) a processor programmed to (i) determine an identifier which is indicative of the source of the new contact, (ii) perform a comparison between said identifier and one or more other identifiers in said memory associated with other contacts which are currently active at the contact center, and (iii) identify from said comparison another identifier indicative of a matching contact having a common source with the new contact; and (d) a rules engine which instructs the termination of at least one contact selected from said new contact and said matching contact upon identification of a matching contact.

As used herein, a computer system may be a general-purpose computer appropriately programmed, or a dedicated machine, or an electronic circuit designed to implement the program steps. It may be a stand-alone, distributed or networked system. Such computer systems will typically have input and output interfaces, a processor, a working memory, and a permanent memory, along with networking connections, peripheral devices and associated hardware and software.

There is provided a computer program product comprising a non-transitory computer-readable medium carrying instructions in machine-readable form which when executed in a computer system of a contact center are effective to carry out the following steps:

(a) receiving notification of a new contact at a contact center;

(b) determining an identifier which is indicative of the source of the new contact;

(c) performing a comparison between said identifier and a stored record of other identifiers associated with other contacts which are currently active at the contact center;

(d) identifying from said comparison another identifier indicative of a matching contact having a common source with the new contact; and (e) terminating at least one contact selected from said new contact and said matching contact.

As used herein the term "non-transitory computer-readable medium" refers to a non-transitory medium that participates in directly or indirectly storing instructions and or data. A computer readable medium may take forms including but not limited to non-volatile media and volatile media.

Non-volatile media may include for example optical or magnetic disks and so on. Volatile media may include for example semiconductor memories, dynamic memory and so on. Common forms of a computer-readable medium include but are not limited to a floppy disk, a flexible disk, a hard disk, a magnetic tape, other magnetic medium, other optical medium, a RAM (random access memory), a ROM (read only memory), and other media from which a computer a processor or other electronic device can read.

There is further provided a method of managing a contact at a contact center, comprising the steps of:

(a) receiving a new contact;

(b) determining an identifier which is indicative of the source of the new contact;

(c) performing a comparison between said identifier and a stored record of other identifiers associated with other contacts which were received at the contact center, wherein at least some of said other identifiers include a status indicator indicative of an unsuccessful resolution according to one or more predetermined criteria;

(d) identifying from said comparison another identifier indicative of a matching contact having a common source with the new contact, wherein said matching contact is a contact having said status indicator indicative of an unsuccessful resolution; and (e) providing an improved service level to said new contact.

The improved service level can be implemented by increasing priority, for example, or by routing the contact to an agent who is associated with improved service levels, e.g. one who has above average customer satisfaction scores.

This aspect of the invention enables the early identification of a contact which has an association with earlier contacts which had been resolved unsatisfactorily. For example, the earlier contacts may be ones which have a history of call abandonments. Callers who have abandoned one or more earlier contact attempts can thus be flagged, and if a subsequent contact is received which is determined by the association criteria to be from the same or an associated caller, then the priority can be increased or their experience can be improved in other ways, with the intention that the call with be answered earlier or more expertly, and thus the customer satisfaction and the statistical performance of the contact center can be improved.

Preferably, therefore, said predetermined criteria can be selected from abandonment of a contact attempt, flagging as a result of automatic analysis of completed contacts where said analysis is indicative of failure to meet a satisfactory standard, flagging by an agent of the contact center who handled the contact, and an indicator that the earlier contact has not yet been resolved.

Preferably, at least one of said new contact and said matching contact is a non-live contact, such as an email, a voicemail, or a web form submission.

Further, preferably, in such cases, the predetermined criteria include an indicator that the non-live contact has not yet received a response.

This allows contact center operators to recognize a contact, such as a call, coming from a party who is associated with an earlier contact attempt which did not receive a response. For example a customer may send an email. Not having received a response within a day or two, the customer calls the contact center. If the newly received call can be associated with the earlier email, and that email is flagged as being unresolved or not satisfactorily resolved, then the call priority can be increased. The originator does not need to be the same person. For example, the identification of associated contacts may be based on recognizing that the contacts are from the same organization, and it may be deemed important to increase the priority for one contact from that organization when there has been an instance or pattern of poor handling or satisfaction for other contacts from that organization.

The increasing of priority can be accomplished in several ways, including acceleration of handing to an agent, assignment to a high priority queue, immediate assignment to an agent, assignment to an expert agent or one with predetermined skill levels, the generation of a warning to a supervisor, or any other appropriate prioritization technique.

Preferably, the method further comprises assigning said new contact and said matching contact to a same agent, at substantially the same time, for processing. In this way, the agent can handle and process both contacts at once, which may be appropriate where the earlier contact is one which did not receive a response. Customer satisfaction can be improved greatly in this way, e.g. if an agent answering an incoming call says "Mr. Smith, right? I believe you might have sent us an email which I have on my screen now, and you have asked us . . . ".

There is also provided a computer system for managing contacts at a contact center comprising:

(a) an interface to a communications system which receives a new contact;

(b) a memory storing identifiers of contacts received at the contact center;

(c) a processor programmed to (i) determine an identifier which is indicative of the source of the new contact, (ii) perform a comparison between said identifier and one or more other identifiers in said memory associated with other contacts which were received at the contact center, wherein at least some of said other identifiers include a status indicator indicative of an unsuccessful resolution according to one or more predetermined criteria, and (iii) identify from said comparison another identifier indicative of a matching contact having a common source with the new contact, wherein said matching contact is a contact having said status indicator indicative of an unsuccessful resolution; and (d) a rules engine which instructs the increased prioritization of said new contact upon identification of a matching contact.

There is also provided a computer program product comprising a non-transitory computer-readable medium carrying instructions in machine-readable form which when executed in a computer system of a contact center are effective to carry out the following steps:

(a) notification of a new contact at a contact center;

(b) determining an identifier which is indicative of the source of the new contact;

(c) performing a comparison between said identifier and a stored record of other identifiers associated with other contacts which were received at the contact center, wherein at least some of said other identifiers include a status indicator indicative of an unsuccessful resolution according to one or more predetermined criteria;

(d) identifying from said comparison another identifier indicative of a matching contact having a common source with the new contact, wherein said matching contact is a contact having said status indicator indicative of an unsuccessful resolution; and (e) providing increased priority to said new contact.

There is further provided a method of managing a contact at a contact center, comprising the steps of:

(a) determining, during or after the handling of a contact at the contact center that said contact has achieved a predetermined performance metric;

(b) determining, from a stored record of other contacts currently active at the contact center, one or more other contacts having a shared characteristic with said contact; and (c) providing to at least one of said one or more other contacts having a shared characteristic increased resources or an increased prioritization.

This method enables the contact center operator to automatically identify a contact or a group of contacts which have achieved some particular result, such as a revenue target. By examining other contacts currently active at the contact center which share some characteristic which is likely to be indicative of a prospect for similarly good revenue, the prioritization of such contacts can be increased and/or the resources devoted to those contacts can be increased.

The prioritization can be increased in any of the ways previously discussed, or in any other suitable manner.

Preferably, the determination of the achieving of a predetermined performance metric comprises comparing a sales or revenue figure achieved in relation to said contact with a target level.

In one embodiment, the step of determining that a contact has achieved of a predetermined performance metric comprises aggregating said contact in a group of contacts, comparing the aggregate performance metrics of said group of contacts, and determining that said aggregate performance metrics have achieved a predetermined level.

In this way, a particularly useful application of the method is to identify one or more queues or skillsets of contacts which are currently outperforming other contacts, and increasing the contact center resources to those queues or skillsets, or the priority of those queues or skillsets.

In general, unlike some of the associations between contacts discussed earlier, the associated contacts for this method are unlikely to be contacts which are associated by virtue of being from the same person or the same company. Instead, the associated contacts are likely to be associated by virtue of shared characteristics which are believed, by the person(s) setting the association criteria, to be predictive of the contacts being good prospects for achieving the performance criteria desired.

While the easiest and simplest such association is queue-based, there can also be more sophisticated shared characteristics. For example, a pattern may be observed of increased home insurance sales to callers from a particular locality or area code. While this may be driven by an event not known to the contact center operators it can still trigger increased prioritization to maximize revenue from such callers. For example, reports of the first hurricane of the season arriving early may drive homeowners in the normal path of hurricanes to renew or increase their insurance, and it may be profitable to reassign agents from life assurance to home insurance while this peak lasts, even if the contact center operators are unaware of the reports of an early season.

The association could be from contacts which traversed the same menu choices in IVR, and again this may not be attributable to any reasons known to the contact center operators, but nevertheless if statistically significant it indicates a pattern of shared characteristics indicative of increased revenue or performance, which may be used to pick out other contacts with a higher than average potential.

The following indicators and methods, among others, can be used to determine originators of contacts associated with other originators by employing the associations available from social networks. Such associated originators may indicate other contacts with a potential to meet higher performance characteristics.

From the database of originators, use the recorded ID in a social network mining exercise to determine a list of other people that may be associated with this originator. Store the IDs (SIP URIs, telephone numbers, email addresses, Facebook IDs) as associates of this originator.

For contact centers with web portals, various methods of integrating the web portal with an originator's social network are possible (using third party mechanisms). Such integrations provide access to an originator's social network, from which a list of associations can be mined. For example, after an originator uses the contact center's web page, they can press the Facebook "Like" button. This provides a list of the originator's associates on that social network that also pressed the Like button.

Contact centers can provide a presence on social networks and invite users to become fans or friends of the contact center. Doing so allows the contact center to extract the list of friends of anyone who befriended the contact center. This extraction is done when someone who befriended the contact center makes contact using an identity that is already known to be related to the ID that befriended the contact center, and the friend list is stored as associations for that originator.

Contact centers can provide a plugin to certain social network sites which appear as applications (ex. "contact me"). When pressed, this will provide the contact center with the friend list of originator that used the plugin. The friend list is then stored as associations for that originator.

Contact centers can mine social networks using home grown or third-party tools to find phone numbers and email addresses that match known originators, then store their friend lists as associations.

BRIEF DESCRIPTION OF THE DRAWINGS

The invention will now be further illustrated by the following description of embodiments thereof, given by way of example only with reference to the accompanying drawings, in which.

DETAILED DESCRIPTION

Figure 1:
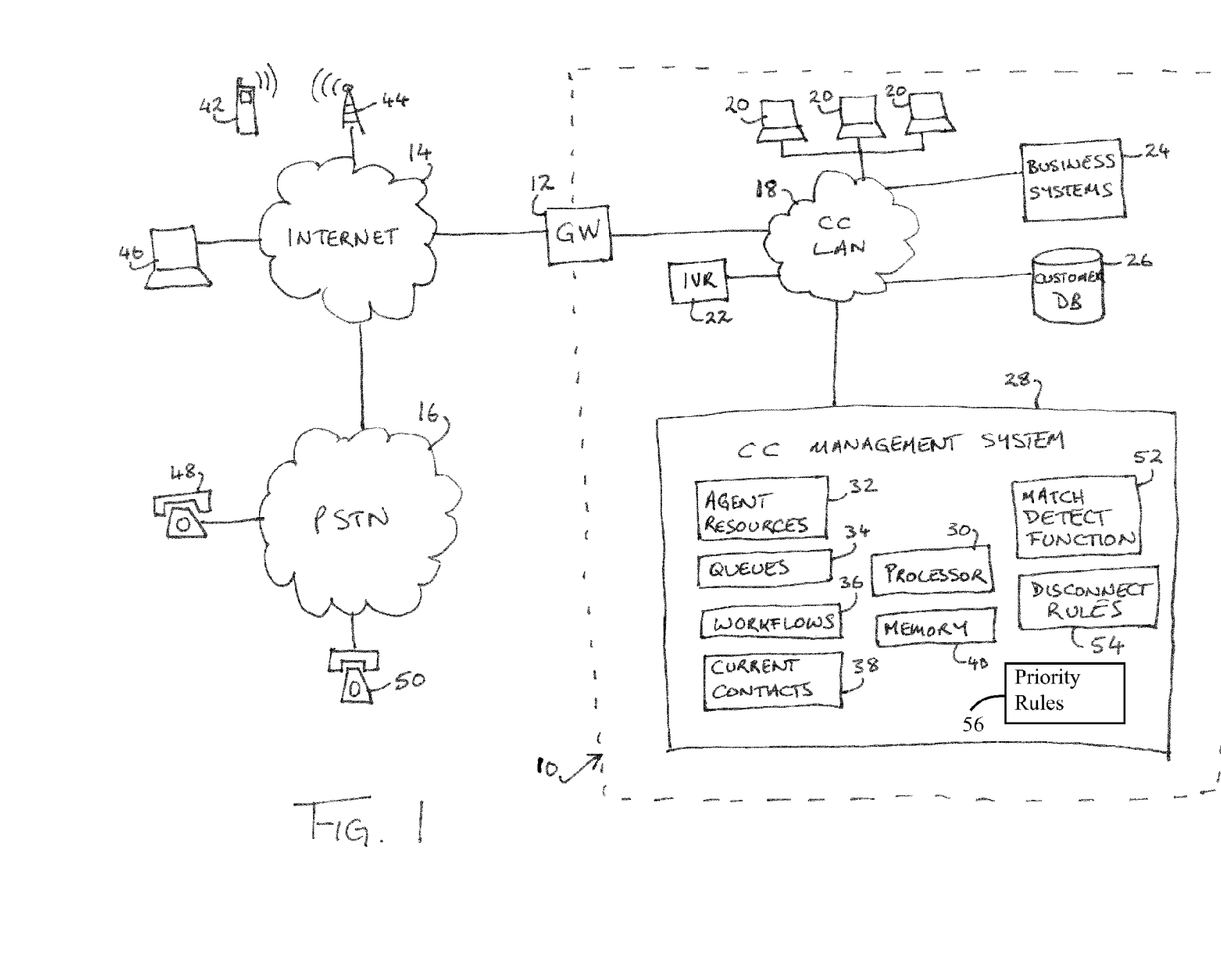
FIG. 1 is a system architecture diagram of a contact center and users thereof connected over a network.

In FIG. 1 there is indicated, generally at 10 a contact center system for implementing the method of managing contacts described herein. The contact center 10 includes a gateway 12 providing connectivity to the Internet 14. As shown in FIG. 1, the contact center connects via the Internet to the public switched telephone network 16, although there may equally be a direct telephony trunk connection in known manner.

The gateway 12 incorporates known communications server functionality such as a telephony switch, a SIP (session initiation protocol) server, an IM (instant messaging) server, an email server, a video telephony server, a web server, and so forth, such that communication is enabled using multiple media types between the contact center 10 and the Internet 12. A contact center LAN (local area network) 18 is provided for communication within the contact center between various resources of the center including a plurality of agent workstations 20 used by human agents to interact with contact center users or customers, automated workflow process such as an IVR (interactive voice response) system 22, business systems and processes 24, a customer database 26, and a contact center management system 28.

It will be appreciated that the aforementioned components of the contact center can incorporate any conventional functionality of a contact center. So for example, the illustrated IVR system 22 can serve music and other media on demand as part of an automated IVR and queuing process. Similarly, the business systems 24 can incorporate functions such as billing, payment, product ordering and dispatch, account activation, ticket allocation, or any other required business system which may be needed to serve the needs of the contact center and its customers.

The customer database 26 is populated with records of users or customers of the contact center, and such records will typically include name and address details, usernames, passwords, card payment details, account numbers, telephone numbers and other contact details including email and IM addresses, known IP addresses, and so on. New records are created for new contacts arriving at the contact center if they cannot be associated with existing records, or where a contact is recognized as originating from a known existing customer, then the contact record for that particular session may include a reference to the customer database record of the customer in question.

The contact center management system 28 incorporates a processor 30 which manages several records and subsystems required to operate the contact center in known manner, including a record of available agent resources 32, a queue management subsystem 34, a workflow management subsystem 36 (which determine the steps involved in treating a contact such as routing to IVR 22, allocation to a queue 34, and allocation to an available agent 20), and a dynamically updated contact record 38 of contacts which are currently live at the contact center. The latter record may also include historical records of contacts which have been terminated. The processor 30 has access to a memory 40 as part of an overall implementation within a computer system, again in known manner.

The contact center can thus operate in conventional mode, receiving contacts from users outside the contact center, such as a contact from a mobile phone 42 via a cellular phone network 44 connected to the Internet 14, or a contact from a computer user 46 (who may communicate using telephony, instant messaging, email, interaction with a web server, or in any other suitable manner), or from telephone callers 48,50 connected to the PSTN 16 or to the Internet 14.

When a contact is received at the gateway 12, a new contact record is created in the contact record area 38, and the contact center management system then routes the communications session associated with the contact to the various resources of the contact center in accordance with the workflows 36, such as by using an IVR session 22 to deduce the nature of the contact and the skillsets required to handle it, allocating the contact to a suitable queue 34, and when an agent 20 is available to handle the contact, placing the agent in communication with the contact. The contact center will also generally incorporate further components which are conventional and typical such as a call recording mechanism, conferencing mechanisms, supervisor functionality, statistics and records, etc., none of which are shown for conciseness.

The contact center management system also includes two additional components, shown as a match detect function 52 and a storage area for disconnect rules 54, whose operation will now be illustrated with reference to FIGS. 2-4. A storage area for priority rules 56 is also provided and whose operation will be illustrated with reference to FIGS. 5, 6 and 7.

Figure 2:
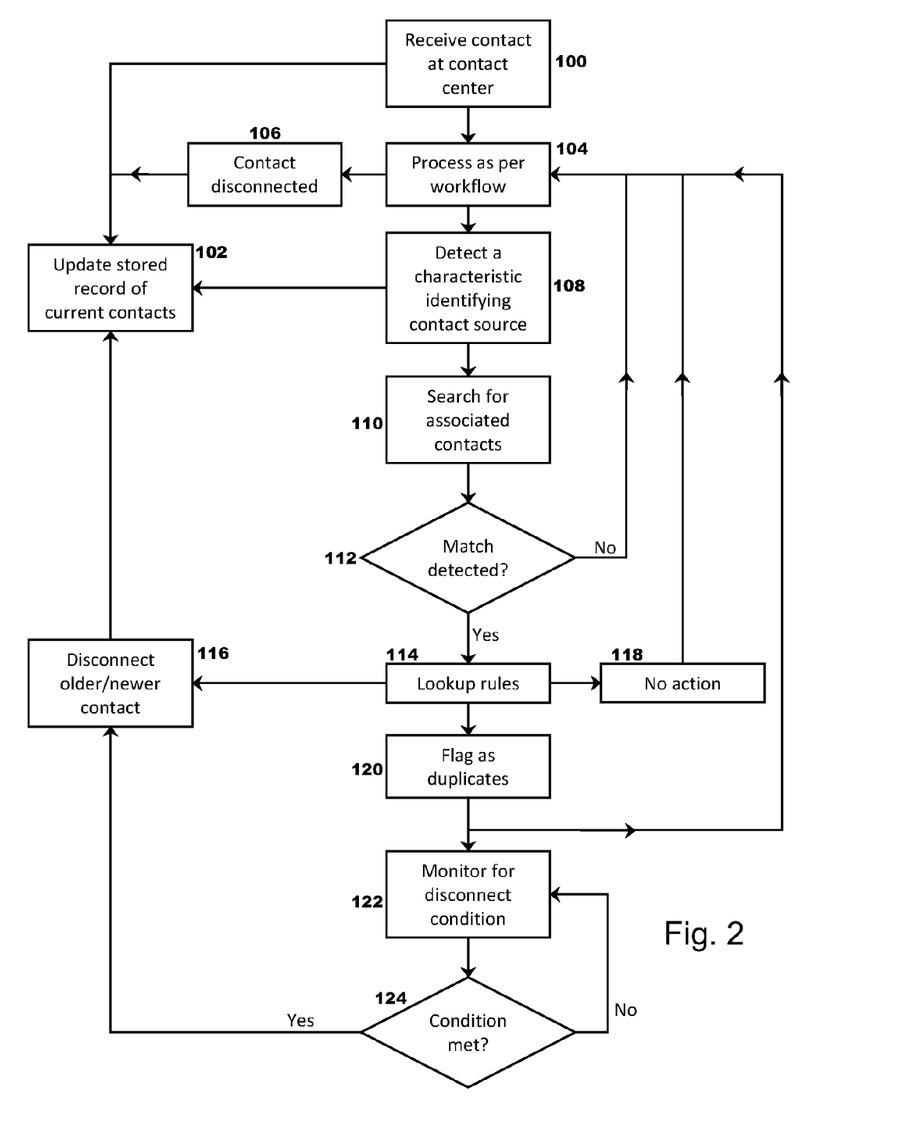
FIG. 2 is a flowchart of operation of a method of managing contacts, according to an embodiment of the invention.

As shown in FIG. 2 and described above, when a contact is received, step 100, a record is created by updating the stored record 38 of current contacts, step 102. The contact is then processed in conventional manner according to the workflows 36, step 104. At any point in the normal processing of a contact, the contact may be terminated, as shown in step 106, which results in the contact record 38 being updated to note this fact, step 102.

At every point in the process where a characteristic identifying the contact source is made available to the contact center systems, step 108, the stored record 38 of current contacts is updated with this identifier, step 102. The stored record can contain pointers to the customer database 26, in which case the two systems can be considered together as constituting the record of current contacts. In alternative architectures a single database can handle the customer records and the current contact functionality 38.

Whenever a new identifier is detected in step 108, a search is conducted, step 110 by the match detect function 52 for associated contacts, i.e. those that have identifiers indicative that they may be from the same source as the new contact. The match detect function can be as simple or as complex as desired, so that it may simply look for an exact match between identifiers, or it may look for any pair of identifiers which are associated with the same record in a customer database, or it may employ confidence algorithms or fuzzy logic to provide a more sophisticated evaluation of whether two contacts are likely to emanate from the same user.

The match detect function can also interact with the other systems of the contact center such as the workflows and the IVR system. For example, if a pair of contacts are suspected to emanate from the same user, one or both may be routed to an interactive test in which the user is prompted for unique information, preferably information which the user will be required to provide to complete a valid transaction, such as a credit card number, social security number, or delivery address. If the results of the interactive test strengthen or weaken the suspected match, this can assist in deciding whether to treat the suspected match as valid or not.

Thus, a decision point is reached, step 112, which determines if a valid match has been detected, step 112. If not, then the normal processing continues, step 104. In such cases, nevertheless, one or both of the new contact and the suspected matching contact can be flagged as a suspected match for future reference as this may strengthen the level of probability if new information is gleaned which is indicative of a match.

If a match is detected in decision 112, the disconnect rules 54 are consulted, step 114. These rules can result in several actions being taken, and the rule invoked may be dependent on the nature and strength of the match detection. The rules may also make reference to the current state of the contact(s) and the contact center generally. Thus, for example, different stringencies of rules may be applied when the contact center is quiet than when it is busy. Furthermore, the action to be taken can be dependent on whether both contacts are queuing for or consuming the same resource.

Thus, one action may be to immediately disconnect one or both contacts, step 116. An alternative rule might specify that no action is to be taken, step 118, for example if the contact center is not currently busy, or if the nature of the match detected indicates that there is no need to disconnect either contact, or if the two contacts are not competing for similar resources or are not adversely affecting other users of the contact center.

In a third example, the rules might decide that immediate termination is not required but that the new contact and/or matched contact(s) should be flagged as duplicates, step 120 and that normal processing should continue, step 104 while in parallel monitoring is put in place for a disconnect condition, step 122. The disconnect condition could be an increased level of contact center activity, a determination that the two contacts are competing for similar resources, a determination that one contact has been allocated a scarce resource so that the other contact is redundant, or a determination that the competing contacts are adversely affecting other users. If the disconnect condition is not met, decision 124, then monitoring continues in step 122 while the contacts continue to be processed as normal. If the disconnect condition is detected in decision 124, however, then the process moves to step 116 by disconnecting one or both contacts according to disconnect rules, and the stored record of live contacts is updated accordingly, step 102.

Figure 3:
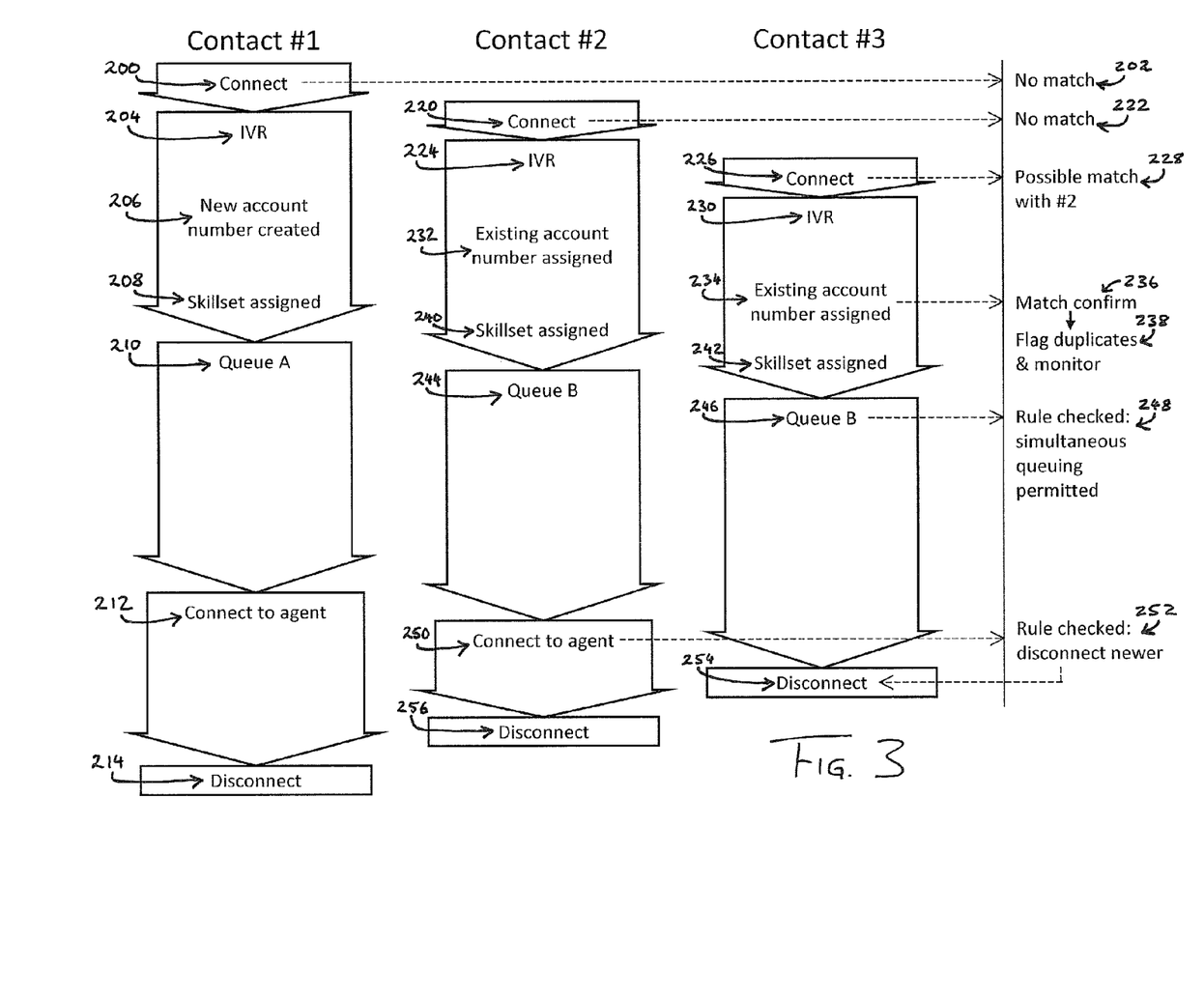
FIGS. 3 and 4 are timelines illustrating two scenarios in which the method shown in FIG. 2 is operated.

FIG. 3 shows a timeline of events for three contacts, contact #1,#2 and #3 which sequentially arrive at the contact center 100. In FIG. 3, time progresses vertically down the figure, such that later events occur lower than earlier events. Contact #1 connects, 200, and a determination is made that contact #1 does not match any existing contacts, 202. Contact #1 is then routed to IVR, 204 and during this process a new account number is created for the customer 206 and a skillset assigned to handle the contact, 208. At this point, the contact #1 is placed in a queue, 210, and after a period of time queuing the contact is connected to a live agent, 212. Following their interaction and perhaps the completion of a transaction, contact #1 disconnects, 214. Apart from the initial check for a match, the creation of a live contact record and the updating of that record to show that the contact has disconnected, the workflow of FIG. 2 has little impact on contact #1 which is processed conventionally at the contact center.

Shortly after contact #1 connected, contact #2 then connects, 220 and again it is determined for contact #2 by the match detect function 52 (FIG. 1) that no match exists 222 with any existing contact, including contact #1, based on the information available (e.g. incoming phone number as detected by calling line ID or the source IM address or IP address). Contact #2 is placed into the IVR process, 224. Shortly afterwards, contact #3 connects 226. Based on information available to the contact center, a possible match with contact #2 is noted, 228. However, as the match cannot be confirmed no immediate action is taken and contact #3 is similarly routed to IVR, 230.

During these parallel IVR processes for contacts #2 and #3, each contact is interrogated for information allowing an existing account number to be assigned. This occurs first for contact #2, 232 and then for contact #3, 234. When the same account number is assigned to contact #3 the possible match noted earlier at 228 is confirmed, 236. The disconnect rules specify in this instance that the older contact #2 and newer contact #3 should be flagged as (confirmed) duplicates, 238 and monitored for a disconnect condition.

Both contacts are assigned skillsets 240, 242, and both are placed into the same queue, 244, 246. At the point where contact #3 joins the same queue as contact #2, the monitoring process checks the disconnect rules which indicate that simultaneous queuing in the same or associated queues is permitted for duplicate contacts, 248.

Contact #2 reaches the top of the queue first and is assigned to an agent, 250. However, this event triggers another check by the monitoring process, 252, and it is found that the disconnect rules applying to duplicate contacts #2 and #3 prohibit one contact remaining live in a queue while another contact is in communication with a live agent. This rule prevents duplicate contact from continuing to occupy resources if the user forgets to disconnect the less successful of a multiple contact attempt. The rule specifies that the newer of the contacts is to be disconnected when the older one is in communication with an agent, and accordingly, contact #3 is disconnected automatically at this point, 254. Contact #2 is not affected and eventually disconnects when the interaction with the agent is complete, 256.

Figure 4:
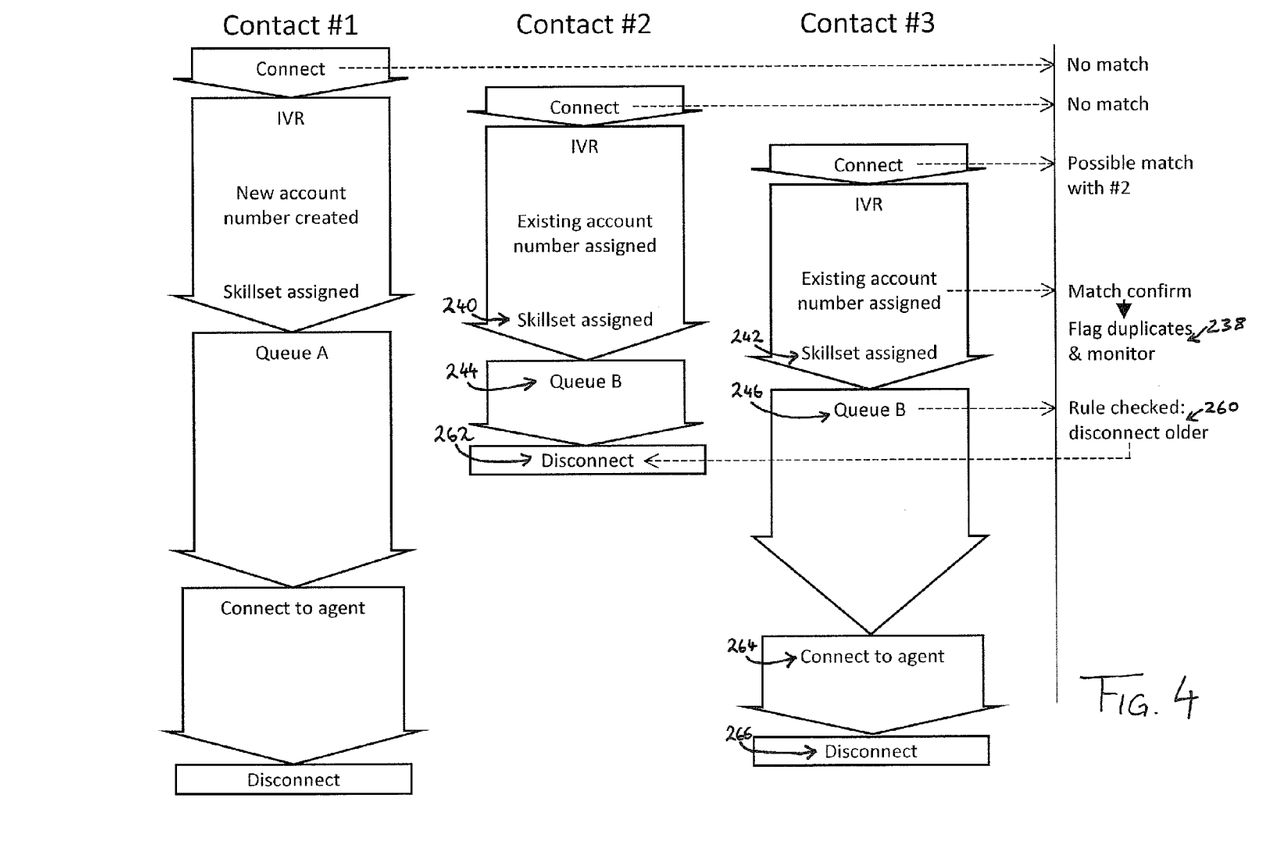

FIG. 4 shows a similar view of the three contacts, but with different rules being applied. In FIG. 4, the progression of contact #1 is identical to that in FIG. 3 and contact #1 therefore need not be described again.

For contacts #2 and #3 the process is identical to that of FIG. 3 up to the point where the duplicates have been flagged for monitoring, 238 and the contacts have been assigned skillsets 240,242. At this stage, contact #2 is again assigned to a queue, 244 and contact 3 is assigned to the same queue, 246. As in FIG. 3 this event triggers a rule check, but unlike in the case of step 248, the rules in the scenario of FIG. 4 are found to prohibit simultaneous queuing, and furthermore, they specify that the older of the two contacts should be disconnects, 260. Accordingly, contact #2 is disconnected, 262 and contact #3 is permitted to continue to queue until it is assigned an agent 264 and ultimately disconnects 266.

It will be appreciated that FIGS. 3 and 4 illustrate just two scenarios based on two sets of rules, and that other outcomes will be reached where different rules are put in place for handling either suspected or confirmed duplicates.

It is also to be noted that the process can equally apply to situations where matches between more than two contacts are detected, i.e. where the match detection process finds several contacts suspected to be from the same source.

Furthermore, it should be recognized that a facility can also be provided for removing a flag for a suspected or confirmed match where later information indicates that the match was erroneous.

Figure 5:
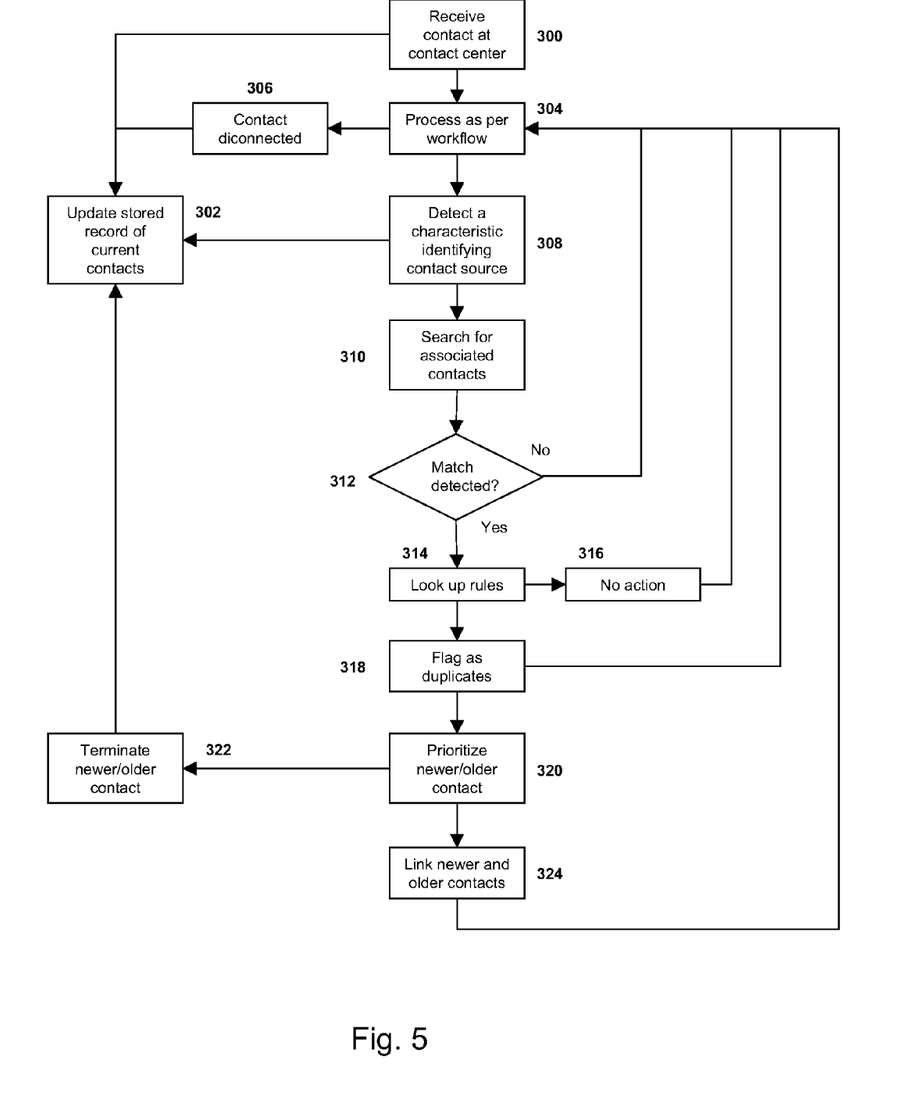
FIG. 5 is a flowchart of operation of a method of managing contacts, according to an embodiment of the invention.

Referring now to FIG. 5, there is depicted a flowchart for an alternative method of managing a contact at a contact center. This method is designed particularly to identify contacts which are associated with earlier contacts from the same or an associated party, where that contact attempt is nevertheless unresolved. The most common example of this is where there is an unanswered email or web form contact or voicemail in the record of contacts, and a subsequent new contact attempt is determined to originate from the same or an associated source, in which case matching and prioritizing of the contacts is possible.

As is the case with the embodiment discussed with reference to FIG. 2, when a contact is received, step 300, a record is created by updating the stored record 38 of current contacts, step 302. The contact is then processed in conventional manner according to the workflows 36, step 304. At any point in the normal processing of a contact, the contact may be terminated, as shown in step 306, which results in the contact record 38 being updated to note this fact, step 302.

At every point in the process where a characteristic identifying the contact source is made available to the contact center systems, step 308, the stored record 38 of current contacts is updated with this identifier, step 302. The stored record can contain pointers to the customer database 26, in which case the two systems can be considered together as constituting the record of current contacts. In alternative architectures a single database can handle the customer records and the current contact functionality 38.

Whenever a new identifier is detected in step 308, a search is conducted, step 310, by the match detect function 52 for associated contacts, i.e. those that have identifiers indicative that they may be from the same source as the new contact. The match detect function can be as simple or as complex as desired, so that it may simply look for an exact match between identifiers, or it may look for any pair of identifiers which are associated with the same record in a customer database, or it may employ confidence algorithms or fuzzy logic to provide a more sophisticated evaluation of whether two contacts are likely to emanate from the same user. As discussed in relation to the method of FIG. 2, the match detect function can also interact with the other systems of the contact center such as the workflows and the IVR system.

This match detect function looks for matches between the new contact and earlier contacts which are still pending at the contact center and flagged as being unanswered or unresolved. So for example, it might detect a common source for a new call contact and an older unanswered or unresolved email or voicemail message.

A decision point is reached, step 312, which determines if a valid match has been detected. If not, then the normal processing continues, step 304. In such cases, nevertheless, one or both of the new contact and the suspected matching contact can be flagged as a suspected match for future reference as this may strengthen the level of probability if new information is gleaned which is indicative of a match.

If a match is detected in decision 312, the priority rules 56 are consulted, step 314. These rules can result in several actions being taken, and the rule invoked may be dependent on the nature and strength of the match detection. The rules may also make reference to the current state of the contact(s) and the contact center generally. Thus, for example, different stringencies of rules may be applied when the contact center is quiet than when it is busy. Furthermore, the action to be taken can be dependent on whether both contacts are queuing for or consuming the same resource.

Thus, one rule might specify that no action is to be taken, step 316, for example where although the contacts are from the same source, analysis shows that they probably relate to different matters, or where there is a history of multiple contacts from the same source being allowed and desired (e.g. a major ticketing agent detects a pattern of allowable multiple contact attempts from the same caller ID number or IP address, this caller ID or IP address being that of a major employer, and the multiple attempts usually being from different customers). Another rule may dictate that the two contacts be flagged as duplicates, step 318, and the contacts continue to be processed as normal, step 304.

Alternatively, the rules might decide that the new contact and/or matched older contact(s) should be flagged as duplicates, step 318, and the newer contact and/or older contact(s) be prioritized 320 with respect to other contacts at the contact center to thereby accelerate the processing of the new contact and/or matched older contact. For example, the new contact and/or matched older contact may be assigned to the next available agent, or the next expert available agent, or maybe promoted in a queue for assignment to an agent.

Furthermore, the rules might dictate that one of the newer contact or older contact(s) be terminated, step 322, and accordingly, the contact record 38 is updated to note this fact, step 302.

In the case that both of the newer contact and older contact(s) remain pending, the newer contact and older contact(s) are preferably linked to one another, or otherwise associated with one another, step 324, such that once one of the newer contact or the older contact(s) is assigned to an agent for processing, the agent is also assigned the other of the newer contact or older contact(s). For example, if a new call contact is received at the contact center and it is identified that an older email contact is still awaiting processing, the new contact may be prioritized and once the contact is assigned to an agent for handling, the agent is also assigned the older email contact, preferably at substantially the same time, and thereby, both the newer contact and older contact(s) can be handled by the same agent, at the same time.

Figure 6:
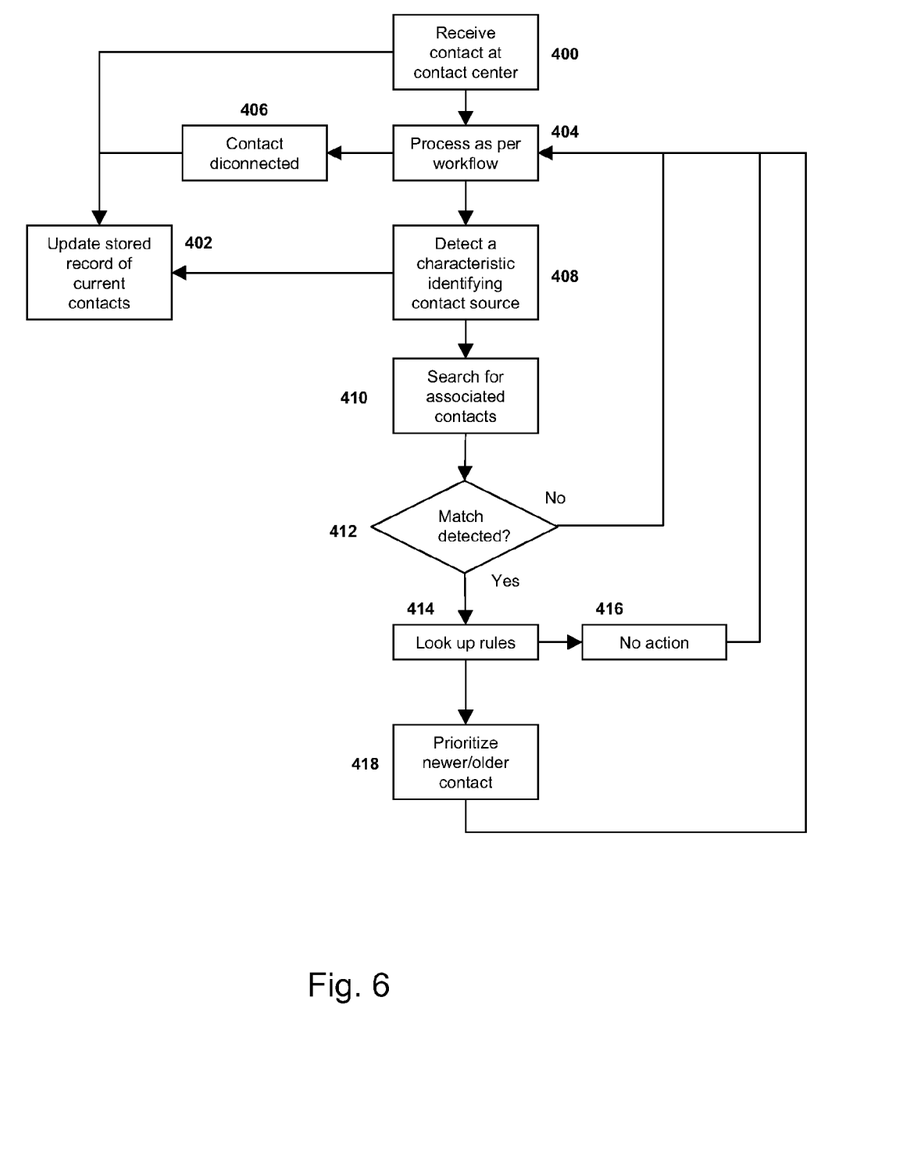
FIG. 6 is a flowchart of operation of a method of managing contacts, according to an embodiment of the invention.

Referring now to FIG. 6, there is depicted a flowchart for another alternative method of managing a contact at a contact center. This method is designed particularly with the scenario in mind that a new contact is received from a customer who has a history which includes one or more unsatisfactory earlier contacts no longer active. Most commonly this will detect a customer with one or more call abandons recorded against earlier contacts.

As is the case with the embodiments discussed with reference to FIG. 2 and FIG. 5, when a contact is received, step 400, a record is created by updating the stored record 38 of current contacts, step 402. As previously indicated, the stored record 38 is also arranged to store a record of inactive contacts or contacts which have been terminated. The contact is then processed in conventional manner according to the workflows 36, step 404. At any point in the normal processing of a contact, the contact may be terminated, as shown in step 406, which results in the contact record 38 being updated to note this fact, step 402.

At every point in the process where a characteristic identifying the contact source is made available to the contact center systems, step 408, the stored record 38 of current contacts is updated with this identifier, step 402. The stored record can contain pointers to the customer database 26, in which case the two systems can be considered together as constituting the record of current contacts. In alternative architectures a single database can handle the customer records and the current contact functionality 38.

Whenever a new identifier is detected in step 408, a search is conducted, step 410, by the match detect function 52 for associated contacts, i.e. those that have identifiers indicative that they may be from the same source as the new contact, and in particular, associated contacts that are currently inactive, having been previously terminated without having been processed or without having been satisfactorily resolved. The flagging of earlier contacts in this way can occur automatically or manually using any suitable functionality to detect behaviors or characteristics indicative of an unsuccessful resolution according to one or more predetermined criteria. As previously discussed in relation to the embodiments of FIGS. 2, and 5, the match detect function can be as simple or as complex as desired and can also interact with the other systems of the contact center such as the workflows and the IVR system.

A decision point is reached, step 412, which determines if a valid match has been detected. If not, then the normal processing continues, step 404. In such cases, nevertheless, one or both of the new contact and the suspected matching contact can be flagged as a suspected match for future reference as this may strengthen the level of probability if new information is gleaned which is indicative of a match.

If a match is detected in decision 412, the priority rules 56 are consulted, step 414. These rules can result in several actions being taken, and the rule invoked may be dependent on the nature and strength of the match detection. The rules may also make reference to the current state of the contact(s) and the contact center generally. Thus, for example, different stringencies of rules may be applied when the contact center is quiet than when it is busy.

Thus, one rule might specify that no action is to be taken, step 416.

Alternatively and preferably, the rules might decide that the new contact be prioritized 418 with respect to other contacts at the contact center to thereby accelerate the processing of the new contact on the grounds that the new contact is associated with an older contact which was terminated before having been processed by the contact center, and may therefore be an indication of an unhappy customer. The prioritized contact may be assigned to the next available agent, or the next expert available agent, or maybe promoted in a queue for assignment to an agent, and continues to be processed as normal, step 304.

Figure 7:
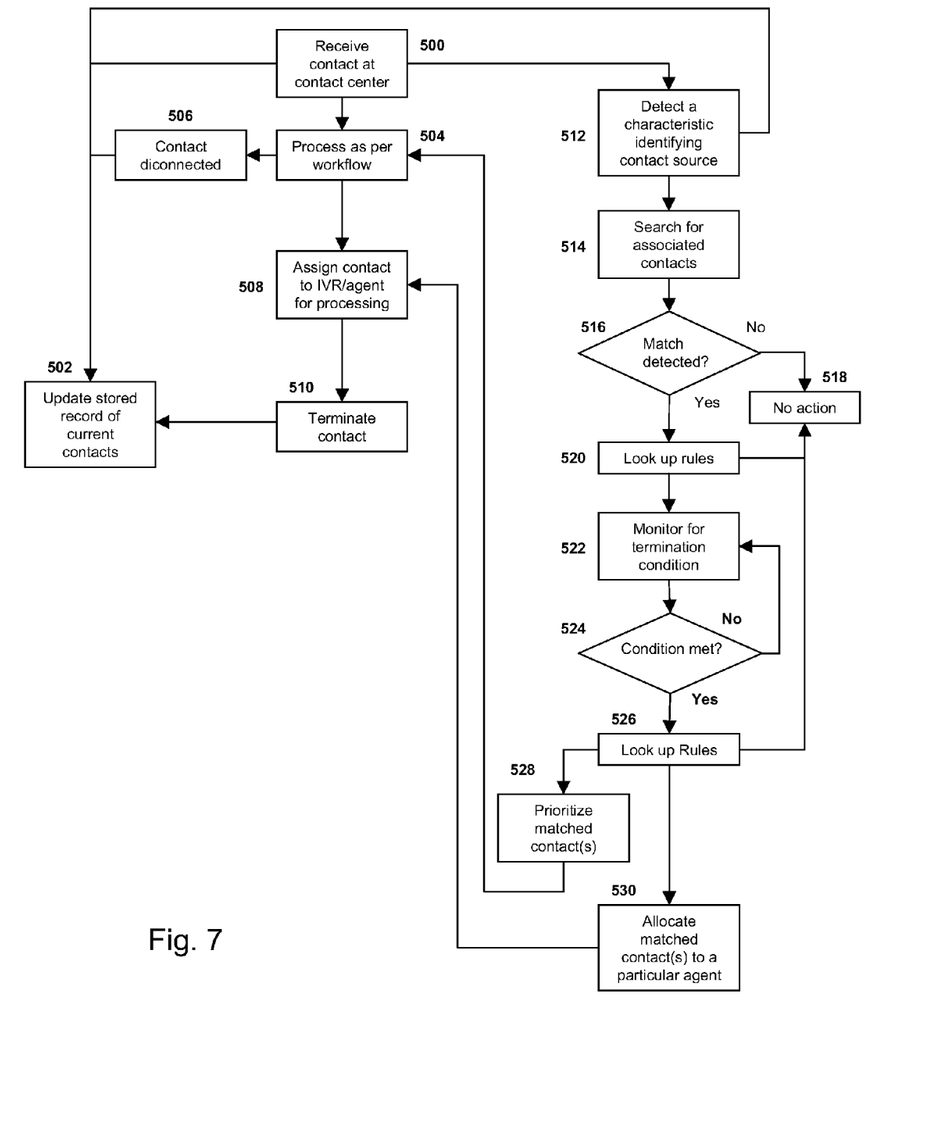
FIG. 7 is a flowchart of operation of a method of managing contacts, according to an embodiment of the invention.

Referring now to FIG. 7, there is depicted a flowchart for a further method of managing a contact center. This method is particularly designed to detect contacts which have achieved a predetermined performance level, or to be part of a group which have achieved such a level, and to identify and prioritize other contacts at the contact center which may have potential for similar performance.

When a contact is received, step 500, a record is created by updating the stored record 38 of current contacts, step 502. The contact is then processed in conventional manner according to the workflows 36, step 504. At any point in the normal processing of a contact, the contact may be terminated, as shown in step 506, which results in the contact record 38 being updated to note this fact, step 502. Otherwise the contact is assigned to the IVR system and/or an agent of the contact center for processing, step 508. When the contact has been processed, it is terminated, step 510, and the contact record 38 is updated accordingly, step 502.

In parallel with the normal processing and assigning of the contact, steps 504 and 506, the contact is analysed to detect a characteristic identifying a contact source, step 512. At every point in the process where a characteristic identifying the contact source is made available to the contact center systems, step 512, the stored record 38 of current contacts is updated with this identifier, step 502.

Whenever a new identifier is detected in step 512, a search is conducted, step 514, by the match detect function 52 for associated contacts, i.e. those that have identifiers indicative that they may be from the same source as the new contact. As previously discussed in relation to the embodiments of FIGS. 2, 5, and 6, the match detect function can be as simple or as complex as desired and can also interact with the other systems of the contact center such as the workflows and the IVR system.

A decision point is reached, step 516, which determines if a valid match has been detected. If not, then no action is taken, step 518.

If a match is detected in decision 516, the priority rules 56 are consulted, step 518. These rules can result in several actions being taken, and the rule invoked may be dependent on the nature and strength of the match detection. The rules may also make reference to the current state of the contact(s) and the contact center generally. Thus, for example, different stringencies of rules may be applied when the contact center is quiet than when it is busy.

Thus, one rule might specify that no action is to be taken, step 518, for example, if the contact center is not currently busy.

Alternatively, the rules might decide that an action should be taken and accordingly, monitoring is put in place to monitor for the termination of the new contact, step 522. When the condition is met and the new contact is determined to have been terminated, step 524, the priority rules are consulted to determine a next suitable course of action, step 526.

The priority rules preferably evaluate the terminated contact against a predetermined performance metric, either alone or in aggregation with other contacts having shared characteristics (e.g. other recent contacts in the same queue). If the contact or group of contacts exceeds the metric, then the rules may specify that some or all matching contacts should be prioritized or allocated increased resources.

Of course the rules may dictate that no action is to be taken, step 518, because, for example, it may be determined that the contact has not met the metric.

Another action may involve prioritizing the matched contact(s) to accelerate the processing of the associated contact(s), step 528, and the matched contact(s) continue to be processed as normal, step 504.

A further action may involve allocating the matched contact(s) to the same agent that handled the new contact to which the matched contact(s) are associated, step 530, and assigning the matched contact(s) accordingly, step 508. In this case, an agent that recently processed the new contact, is assigned the matched contact(s), associated with the new contact based on the assumption that the new contact and matched contacts may have similar needs, which the agent having just handled the new contact, may be more efficient at handling than other agents.

Alternatively, the rules may dictate the allocation of the matched contact(s) to an agent, or an allocation of work to an agent deemed most appropriate to handle the matched contact(s) based on the behavior of the associated new contact. For example, a particular agent may be associated with generating a highest revenue for a given subject matter, and based on the subject matter of the associated terminated contact, it is determined that the allocation of the matched contact(s) to that agent has the best chance of generating the most revenue from the contacts.

As opposed to being carried out in parallel with the normal processing of the new contact, it will be appreciated that in an alternative embodiment of the method illustrated in FIG. 7, the steps of detecting a characteristic of a contact source, identifying at least one matched contact and processing the matched contact(s) based on information associated with the new and terminated contact may all be carried out once the new contact has been terminated, and may be as simple as detecting matching contacts by virtue of having the same skillsets or being in the same queue as the contact which has terminated.

The invention is not limited to the examples given above which may be varied or modified within the scope and spirit of the invention.

What is claimed is:

1. A method of managing a contact at a contact center, comprising the steps of:
   (a) receiving, at a gateway of the contact center, a new contact from a source external to the contact center;
   (b) determining, by a contact center management computer, an identifier which is indicative of the source of the new contact;
   (c) performing, by the contact center management computer, a comparison between said identifier and a stored record of other identifiers associated with other contacts received at the contact center, which are currently active at the contact center;
   (d) identifying, by the contact center management computer, a matching contact having a common source with the new contact, based on the comparison between said identifier and the other identifiers;
   (e) terminating, by the contact center management computer, one of said new contact and said matching contact when the other one of said new contact and said matching contact is assigned a contact center resource thereby limiting duplicate contacts from a common source occupying contact center resources;
   (f) determining, during or after the handling of the terminated one of the new contact and the matching contact that said terminated contact has achieved a predetermined performance metric;
   (g) determining, from a stored record of other contacts currently active at the contact center, one or more other similar contacts having a shared characteristic with said terminated contact; and
   (h) providing to at least one of said one or more other similar contacts having a shared characteristic with said terminated contact increased resources or an increased prioritization.

2. The method of claim 1, further comprising the step, carried out between the identifying step (d) and the terminating step (e), of detecting an additional condition which must be met before said terminating step (e) occurs.

3. The method of claim 2 wherein contacts are assigned to queues for contact center resources, and said additional condition is a requirement that said new contact and said matching contact are queued in associated queues according to a predetermined association between queues.

4. The method of claim 2, wherein said additional condition is a requirement that one of the new contact and the matching contact is allocated a predetermined resource of the contact center.

5. The method of claim 4, wherein said predetermined resource is a connection to a human agent of the contact center.

6. The method of claim 1, wherein said identifying step (d) comprises calculating a match probability or threshold.

7. The method of claim 1 further comprising the step, carried out between the identifying step (d) and the terminating step (e), of detecting an additional condition which must be met before said terminating step (e) occurs, and wherein said additional condition is tailored according to a degree of confidence in the identification of said matching contact in step (d).

8. The method of claim 1, wherein said identifying step (d) comprises consulting a source which includes additional information relating to said contacts.

9. The method of claim 8, wherein said source is a database which includes multiple known identifiers for known customers, said known identifiers being selected from two or more of: an IM username, a telephone number, an email address, a credit card number, a social security number, a username/password combination, a customer name, a customer address, an IP address, and a MAC address of a computing device.

10. The method of claim 1, wherein the determination of the achieving of a predetermined performance metric comprises comparing a sales or revenue figure achieved in relation to said terminated contact with a target level.

11. The method of claim 1, wherein the step of determining that a contact has achieved a predetermined performance metric comprises aggregating said terminated contact and said one or more other similar contacts in a group of contacts, comparing the aggregate performance metrics of said group of contacts, and determining that said aggregate performance metrics have achieved a predetermined level.

12. The method of claim 11, wherein said group of contacts comprises one or more queues or skillsets of contacts which are currently outperforming other contacts.

13. A computer system for managing contacts at a contact center comprising:
   (a) an interface to a communications system which receives a new contact from a source external to the contact center;
   (b) a memory storing identifiers of contacts which are active at the contact center;
   (c) a processor programmed to (i) determine an identifier which is indicative of a source of the new contact, (ii) perform a comparison between said identifier and one or more other identifiers in said memory associated with other contacts which are received by and currently active at the contact center, and (iii) identify, based on the comparison between said identifier and the other identifiers, a matching contact having a common source with the new contact;
   (d) a rules engine which instructs the termination of one of said new contact and said matching contact when the other one of said new contact and said matching contact is assigned a contact center resource thereby limiting duplicate contacts from a common source occupying contact center resources; and wherein
   said processor is programmed to (i) determine, during or after the handling of the terminated one of the new contact and the matching contact that said terminated contact has achieved a predetermined performance metric, and (ii) determine from said stored record one or more other similar contacts having a shared characteristic with said terminated contact; and
   said rules engine instructs the provision to at least one of said one or more other similar contacts having a shared characteristic with said terminated contact increased resources or an increased prioritization.

14. The method of claim 1, comprising:
   providing an improved service level to said new contact, wherein at least some of said other identifiers include a status indicator indicative of an unsuccessful resolution according to one or more predetermined criteria; and wherein said matching contact is a contact having said status indicator indicative of an unsuccessful resolution.

15. The method of claim 14, wherein said improved service level is implemented by increasing a priority level allotted to said new contact.

16. The method of claim 14, wherein said improved service level is implemented by routing the new contact to an agent who is associated with improved service levels.

17. The method of claim 14, wherein said predetermined criteria are selected from abandonment of a contact attempt, flagging as a result of automatic analysis of completed contacts where said analysis is indicative of failure to meet a satisfactory standard, flagging by an agent of the contact center who handled the contact, and an indicator that the earlier contact has not yet been resolved.

18. The method of claim 14, wherein at least one of said new contact and said matching contact is a non-live contact that is one of an email, a voicemail, or a web form submission.

19. The method of claim 18, wherein the predetermined criteria include an indicator that the non-live contact has not yet received a response.

20. The computer system of claim 13, wherein at least some of said other identifiers include a status indicator indicative of an unsuccessful resolution according to one or more predetermined criteria, and wherein said matching has said status indicator indicative of an unsuccessful resolution; and said rules engine instructs the provision of an improved service level to said new contact upon identification of the matching contact.

* * * * *